(12) United States Patent
Ide (10) Patent No.: US 11,059,447 B2
(45) Date of Patent: Jul. 13, 2021

(54) COVER BODY FOR AIRBAG APPARATUS

(71) Applicant: NIHON PLAST CO., LTD., Shizuoka (JP)

(72) Inventor: Kyohei Ide, Shizuoka (JP)

(73) Assignee: NIHON PLAST CO., LTD., Shizuoka (JP)

( * ) Notice: Subject to any disclaimer, the term of this patent is extended or adjusted under 35 U.S.C. 154(b) by 44 days.

(21) Appl. No.: 16/695,233

(22) Filed: Nov. 26, 2019

(65) Prior Publication Data

US 2020/0164825 A1 May 28, 2020

(30) Foreign Application Priority Data

Nov. 26, 2018 (JP) .............................. JP2018-220517

(51) Int. Cl.
*B60R 21/203* (2006.01)
*B60R 21/215* (2011.01)
*B60R 21/2165* (2011.01)

(52) U.S. Cl.
CPC ...... *B60R 21/21656* (2013.01); *B60R 21/203* (2013.01); *B60R 2021/21543* (2013.01)

(58) Field of Classification Search
CPC . B60R 21/203; B60R 21/2035; B60R 21/215; B60R 21/2165; B60R 2021/21543; B60R 21/21656
See application file for complete search history.

(56) References Cited

U.S. PATENT DOCUMENTS

| 6,581,311 | B1* | 6/2003 | Davey ................... B60R 13/005 296/214 |
| 7,775,550 | B2* | 8/2010 | Dominguez Aparicio .................. B60R 21/2165 280/728.3 |
| 8,905,430 | B2* | 12/2014 | Ishikawa ............... B60R 21/215 280/728.3 |
| 2006/0061140 | A1* | 3/2006 | Schuetz ................ B60R 21/215 296/201 |
| 2008/0079241 | A1* | 4/2008 | Fujimori ........... B60R 21/21656 280/727 |
| 2008/0252050 | A1* | 10/2008 | Aparicio ............. B60R 21/2165 280/728.3 |
| 2010/0293824 | A1* | 11/2010 | Weigand ............... B60R 13/005 40/299.01 |

(Continued)

FOREIGN PATENT DOCUMENTS

JP 2000-255361 A 9/2000

*Primary Examiner* — Barry Gooden, Jr.
(74) *Attorney, Agent, or Firm* — Brundidge & Stanger, P.C.

(57) ABSTRACT

Emblem body includes emblem main body section and pin projecting to emblem main body section and inserted through opening section. Pin has shaft section continuous with emblem main body section, enlargement section formed to be enlarged on the distal end side of shaft section, planar section formed in a planar shape along a direction intersecting with the protrusion direction of pin in enlargement section, and linear section linearly formed at a position different from planar section along a direction intersecting with the protrusion direction of pin in enlargement section. Back plate is provided with elastic piece section against which planar section and linear section abut from the direction opposite to the protrusion direction of pin at least during airbag inflation deployment.

4 Claims, 6 Drawing Sheets

(56) References Cited

U.S. PATENT DOCUMENTS

| | | | |
|---|---|---|---|
| 2013/0285355 A1* | 10/2013 | Muramatsu | B60R 21/2165 280/728.3 |
| 2014/0145419 A1* | 5/2014 | Ishikawa | B60R 21/215 280/728.3 |
| 2015/0251625 A1* | 9/2015 | Bana Castro | B60R 21/2155 280/728.3 |
| 2015/0283961 A1* | 10/2015 | Barreiro Garcia | B60R 21/215 40/1.5 |
| 2017/0001592 A1* | 1/2017 | Jahme | B60R 21/215 |
| 2020/0164824 A1* | 5/2020 | Ide | B60R 21/21656 |

* cited by examiner

COVER BODY FOR AIRBAG APPARATUS

CROSS REFERENCE TO RELATED APPLICATION

This application is entitled to the benefit of Japanese Patent Application No. 2018-220517, filed on Nov. 26, 2018, the disclosure of which including the specification, drawings and abstract is incorporated herein by reference in its entirety.

TECHNICAL FIELD

The present invention relates to a cover body for an airbag apparatus provided with a decoration member attached with a design section and a receiving section sandwiching an attached section.

BACKGROUND ART

In the related art, an airbag apparatus provided in a handle of a vehicle such as an automobile is used. The airbag apparatus is provided with a bag-shaped airbag, an inflator supplying gas to the airbag, and a cover body covering and storing the airbag when the airbag is folded and not deployed. When the vehicle receives an impact due to a collision or the like, the airbag is inflated by gas being supplied from the inflator to the airbag. The airbag inflation results in breaking of the cover body along a pre-provided break line, that is, a tear line and formation of a plurality of door sections. Then, each of the door sections is deployed about a hinge section, and the airbag is deployed on an occupant side and the occupant is restrained and protected as a result.

Known with regard to such a cover body for an airbag apparatus is a configuration in which an emblem body and a receiving section constitute an emblem (ornament) as a decoration member and the emblem is attached across a recessed section formed in a cover main body section. The emblem body can be positioned by means of the recessed section and it is possible to make it difficult for the emblem to be affected by the curvature of the surface of the cover body by adjusting the curvature of the bottom section of the recessed section separately from the curvature of the surface of the cover body (see, for example, PTL 1).

CITATION LIST

Patent Literature

PTL 1
Japanese Patent Application Laid-Open No. 2000-255361 (FIGS. 1 to 6, Pages 3 and 4)

SUMMARY OF INVENTION

Technical Problem

However, the curvature of the surface section of the cover body and the curvature of the emblem body may be required to be substantially equal with, for example, the emblem attached. In such a case, the draft on the back surface side at a time of emblem body molding is also based on the curvature of the back surface of the emblem body by the back surface of the emblem body being substantially equal in curvature to the surface of the cover body, and thus the inclination by the draft formed in the locking surface at the distal end of the engagement pin projecting from the back surface of the emblem body also increases. As a result, a decrease in contact amount arises between the locking surface of the pin and the locking receiving surface around the hole section of the receiving section. Accordingly, it becomes necessary to, for example, separately enhance the periphery of the locking section such that the emblem body does not fall due to a centrifugal force or the like when the door section is deployed as a result of breaking of the cover main body section, which results in an increase in manufacturing cost.

The present invention has been made in view of the point described above, and an object of the present invention is to provide a cover body for an airbag apparatus capable of increasing the engagement force of a decoration member with respect to a cover main body section by means of a simple configuration.

Solution to Problem

A cover body for an airbag apparatus according to claim 1 is provided with an airbag which is inflated and deployed as a result of introduction of gas from a folded state. The cover body includes a cover main body section which covers the airbag in the folded state and tear opens as a result of inflation and deployment of the airbag and a decoration member which includes a design section and a receiving section and is attached by sandwiching the cover main body section with the design section and the receiving section. The cover main body section includes an opening section. The design section has a design section main body section and an engagement section projecting from the design section main body section and inserted through the opening section. The engagement section has a shaft section connected to the design section main body section, an enlargement section formed to be enlarged on a distal end side of the shaft section, a first contact section formed in a planar shape along a direction intersecting with a protrusion direction of the engagement section in the enlargement section, and a second contact section linearly formed at a position different from the first contact section along the direction intersecting with the protrusion direction of the engagement section in the enlargement section. The receiving section has an abutting section against which the first contact section and the second contact section abut from a direction opposite to the protrusion direction of the engagement section at least during the inflation and deployment of the airbag.

In the cover body for an airbag apparatus according to claim 2, which is the cover body for an airbag apparatus according to claim 1, the engagement section has an inclination section inclined at a first predetermined angle toward a distal end side in the protrusion direction with respect to a predetermined direction intersecting with the direction in which the engagement section protrudes from the design section main body section, and the first contact section is inclined at a second predetermined angle smaller than the first predetermined angle toward the distal end side in the protrusion direction with respect to the predetermined direction.

In the cover body for an airbag apparatus according to claim 3, which is the cover body for an airbag apparatus according to claim 1 or 2, the engagement section has inclination sections formed adjacent to each other on both sides of the engagement section to be respectively inclined at a first predetermined angle toward a distal end side in the protrusion direction with respect to predetermined directions opposite to each other and intersecting with the direction in which the engagement section protrudes from the design section main body section, and the second contact section is formed along a position where the inclination sections are adjacent to each other.

In the cover body for an airbag apparatus according to claim 4, which is the cover body for an airbag apparatus according to claim 2 or 3, a length of the first contact section in a predetermined direction is set shorter than a length of the inclination section in the predetermined direction.

Advantageous Effects of Invention

According to the cover body for an airbag apparatus according to claim 1, the first contact section is formed in a planar shape along the direction intersecting with the protrusion direction of the engagement section in the enlargement section formed to be enlarged on the distal end side of the shaft section of the engagement section of the design section, the second contact section is linearly formed along the direction intersecting with the protrusion direction of the engagement section at a position different from the first contact section, and the first contact section and the second contact section abut against the abutting section of the receiving section from the direction opposite to the protrusion direction of the engagement section at least during airbag inflation deployment. Accordingly, a contact amount can be ensured between the engagement section of the design section and the abutting section of the receiving section and the engagement force of the decoration member with respect to the cover main body section can be increased by means of a simple configuration.

According to the cover body for an airbag apparatus according to claim 2, in addition to the effect of the cover body for an airbag apparatus according to claim 1, the contact amount of the first contact section with respect to the abutting section of the receiving section can be ensured and the engagement force of the decoration member with the cover main body section can be increased since the second predetermined angle as the inclination angle of the first contact section is set smaller than the first predetermined angle as the inclination angle of the inclination section with respect to the predetermined direction intersecting with the direction in which the engagement section protrudes from the design section main body section.

According to the cover body for an airbag apparatus according to claim 3, in addition to the effect of the cover body for an airbag apparatus according to claim 1 or 2, the second contact section can be easily formed by means of a parting line of molding dies opened in the opposite predetermined directions intersecting with the protrusion direction of the engagement section since the second contact section is formed along the position where the inclination sections respectively inclined at the first predetermined angle toward the distal end side in the protrusion direction are adjacent to each other with respect to the predetermined directions opposite to each other and intersecting with the direction in which the engagement section protrudes from the design section main body section.

According to the cover body for an airbag apparatus according to claim 4, in addition to the effect of the cover body for an airbag apparatus according to claim 2 or 3, the engagement section can be removed from the molding dies opened in the predetermined direction even when the second inclination angle of the first contact section is small since the length of the first contact section in the predetermined direction is shorter than the length of the inclination section.

DESCRIPTION OF EMBODIMENTS

Hereinafter, the configuration of one embodiment of the present invention will be described with reference to the drawings.

Figure 6:
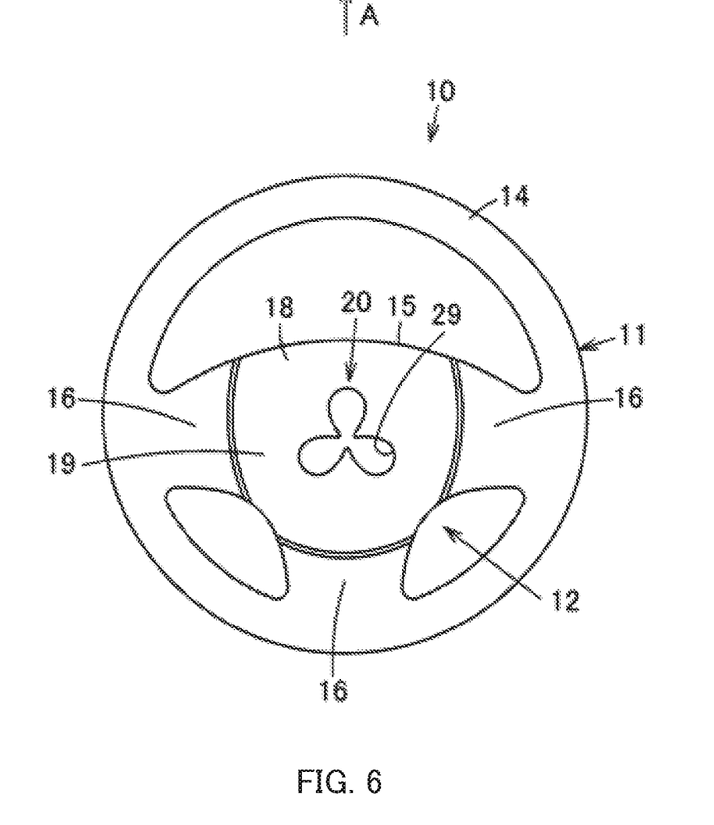
FIG. 6 is a front view illustrating an example of a handle provided with the airbag apparatus.

In FIG. 6, 10 denotes a steering wheel as a handle of an automobile as a vehicle. Steering wheel 10 is provided with steering wheel main body 11 as a handle main body and airbag apparatus 12 mounted on the occupant side of steering wheel main body 11. Steering wheel 10 is mounted on a steering shaft. Usually, the steering shaft is provided in an inclined state in the vehicle. The steering shaft side is the rear side in the following description, the occupant side is the front side in the following description, and the direction toward a windshield (arrow A direction) is the upper side in the following description with a state where the vehicle goes straight ahead used as a reference.

Rim section 14 as a grip section that is an annular grip section, boss section 15 positioned inside rim section 14, and spoke sections 16 interconnecting rim section 14 and boss section 15 constitute steering wheel main body 11.

A substantially cylindrical boss (not illustrated) fitted to the steering shaft is provided in the rear section of boss section 15 and a boss plate constituting a core body is integrally fixed to the boss. The core metal of spoke section 16 is fixed by welding or the like or integrally extended from the boss plate. The core metal of rim section 14 is fixed to the core metal of spoke section 16 by welding or the like. A skin section is formed in the outer peripheral section of the core metal of rim section 14 and the outer peripheral section of the rim section 14 side part of the core metal of spoke section 16. The outer periphery of the skin section is fully or partially covered with natural or artificial leather or the like.

Airbag apparatus 12 is also called an airbag module and is disposed to cover the front side of the boss section of steering wheel main body 11. Airbag apparatus 12 is provided with a base plate as an attached member, a bag-shaped airbag, a gas-injecting inflator, and so on and is provided with cover body 18 illustrated in FIG. 5 and so on. The base plate is attached to steering wheel main body 11 via a horn plate, a bracket section, or the like. The airbag, the inflator, and cover body 18 are attached to the base plate. The folded and small airbag is covered with cover body 18.

Figure 5:
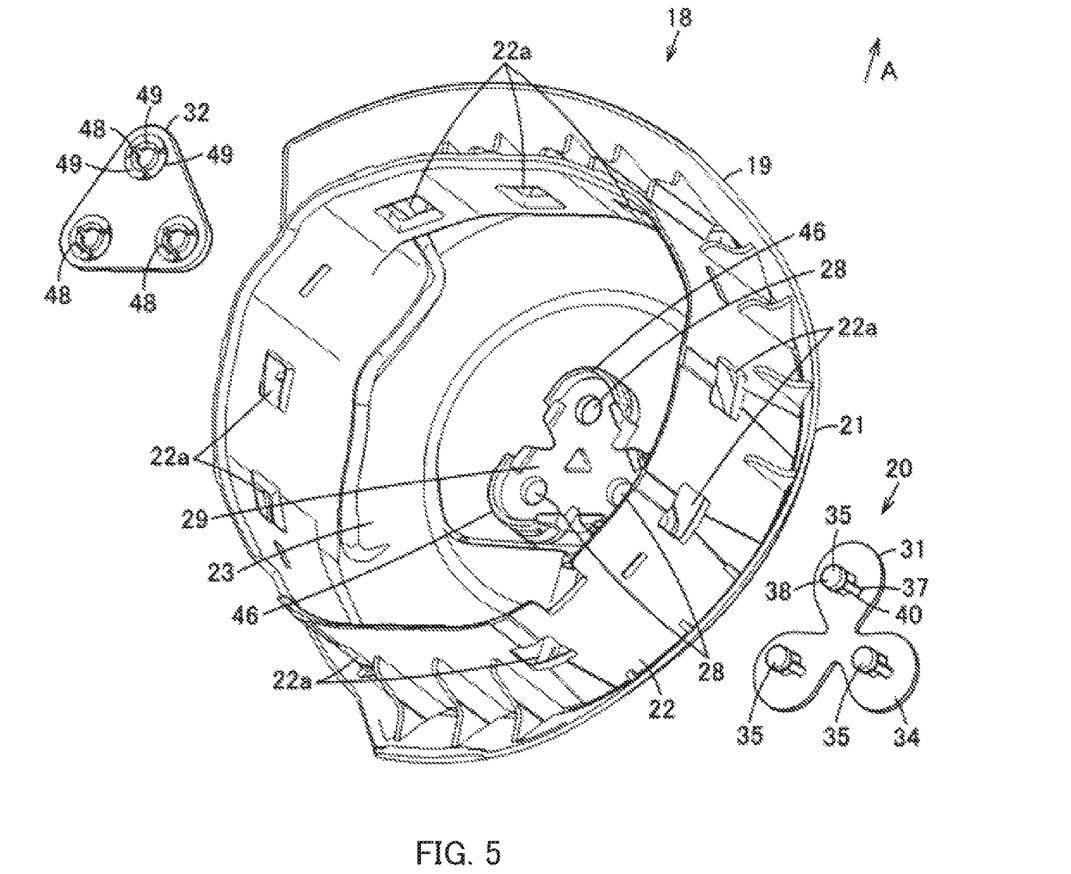
FIG. 5 is an exploded perspective view illustrating a part of the cover body for an airbag apparatus provided with the decoration member.

Cover body 18 is also called a case body, a pad, a module cover, or the like. Cover body 18 is provided with cover main body section 19 that is, for example, an attached section and emblem 20 that is a decoration member attached to cover main body section 19.

Cover main body section 19 is formed of, for example, a synthetic resin. Cover main body section 19 is provided with surface plate section 21 as a covering section covering boss section 15 and spoke section 16 in part and peripheral plate section 22 as a peripheral wall projecting in a tubular shape such as a substantially square tube shape from the rear (back surface) of surface plate section 21 when viewed from the front. The part that is surrounded by surface plate section 21 and peripheral plate section 22 is an airbag storage section where the folded airbag is stored. The part that faces the front side of the airbag storage section is front plate section 23 as a decoration member attachment section. Front plate section 23 is curved to bulge to the front side (occupant side) as, for example, the side opposite to the airbag. In the present embodiment, front plate section 23 is curved along, for example, a spherical surface. In surface plate section 21, a tear line is formed to face the airbag storage section. Door sections are formed during airbag deployment as a result of tear opening of the tear line. This tear line can also be called a scheduled line section, a rupture expected section, or the like, and the rear (back surface) side of front plate section 23 is recessed in a groove shape and is formed as a weak section more fragile than the other parts of front plate section 23. This tear line can be set in any manner at a position avoiding emblem 20 in accordance with the shape and the number of the door sections that are desired to be set. In the present embodiment, the tear line is formed to, for example, continue from one side section of front plate section 23 to the other side section of front plate section 23 via the lower section of emblem 20. Accordingly, the door section is deployed upward with the upper section of emblem 20 of front plate section 23 used as a hinge section. In other words, during tear opening of cover main body section 19 by the tear line, the centrifugal force that results from door section opening is in a direction perpendicularly away from the direction of pivoting of the hinge section (indicated by Arrow B in FIG. 2B).

Opening sections 28 for attaching emblem 20 are open in surface plate section 21. Opening sections 28 are formed in a circular shape and are provided to penetrate front plate section 23 in the front-rear direction, which is a thickness direction. Opening sections 28 can be appropriately set in accordance with the shape of emblem 20 and the like insofar as emblem 20 can be fixed in a balanced manner in the up-down and left-right directions. Set in the present embodiment are, for example, opening section 28 that is positioned in the upper middle section and opening sections 28 and 28 that are positioned in both lower side sections. In the present embodiment, opening section 28 is disposed on, for example, each vertex of an equilateral triangle. In other words, opening sections 28 are disposed in rotational symmetry (three-fold symmetry). In the present embodiment, front plate section 23 of surface plate section 21 is provided with recessed attachment recessed section 29 on the front side as a design surface. Attachment recessed section 29 is a storage section where emblem 20 is stored. Attachment recessed section 29 is disposed in, for example, the middle section of front plate section 23. Attachment recessed section 29 is formed along, for example, the shape of emblem 20. Opening section 28 is disposed in attachment recessed section 29. The bottom section of attachment recessed section 29 is curved along the curvature of front plate section 23.

Peripheral plate section 22 is provided with, for example, engagement opening sections 22a as cover body engagement sections for engaging the base plate and cover body 18 with each other.

Emblem 20 is also called an ornament or the like. Emblem 20 is provided with emblem body 31 as a design section and back plate 32 as a receiving section. Emblem 20 is attached with emblem body 31 and back plate 32 sandwiching front plate section 23 of cover body 18.

Emblem body 31 illustrated in FIGS. 1A, 1B, 2A to 2C, and 5 is also called a design ornament, an upper plate, an upper emblem, or the like. Emblem body 31 is molded with a hard or soft synthetic resin or the like and a surface treatment such as painting and plating is appropriately performed on emblem body 31. Emblem body 31 constitutes a design part of emblem 20. Emblem body 31 is attached to the front side, which is the side of front plate section 23 that is opposite to the airbag. In the present embodiment, emblem body 31 is fitted into attachment recessed section 29. Emblem body 31 is integrally provided with emblem main body section 34 as a design section main body section and pins 35 as engagement sections projecting to emblem main body section 34.

Figure 1A:
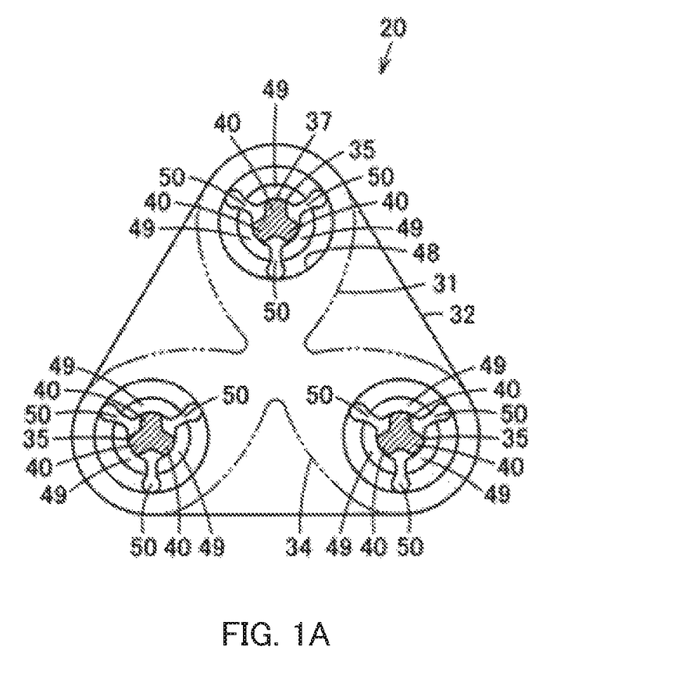
FIG. 1A is a cross-sectional view illustrating a state where a design section and a receiving section of a decoration member of a cover body of one embodiment of the present invention are attached and FIG. 1B is a cross-sectional view illustrating a part of the cover body.
Figure 1B:
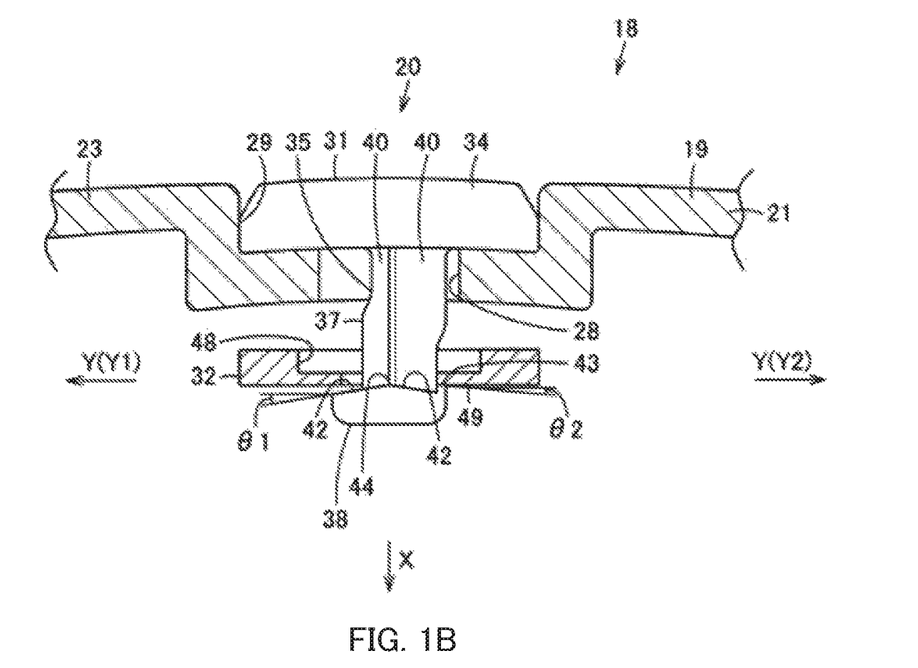
Figure 2A:
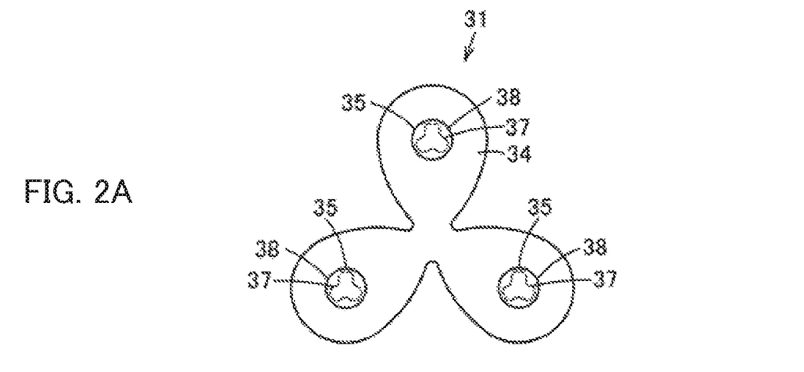
FIG. 2A is a front view illustrating the design section of the decoration member.
Figure 2B:
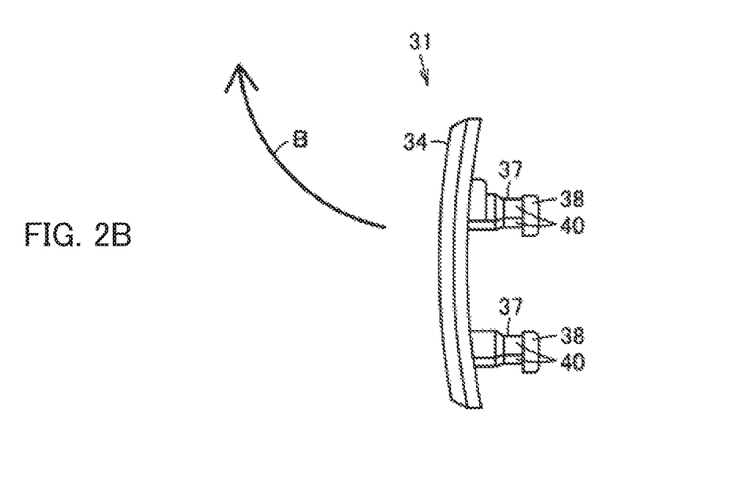
FIG. 2B is a side view illustrating the design section.

Emblem main body section 34 is capable of having various shapes. For example, in the present embodiment, emblem main body section 34 has a so-called clover shape in which three circular parts having the same diameter are equiangularly disposed. In other words, emblem main body section 34 is formed in rotational symmetry. Emblem main body section 34 is positioned in attachment recessed section 29 in the present embodiment. Emblem main body section 34 is formed in a plate shape and is curved to bulge to the design surface side. In other words, emblem main body section 34 is formed to gradually protrude from a peripheral edge part toward a middle part. Emblem main body section 34 is curved along the curvature of front plate section 23 of surface plate section 21 and the curvature of the bottom section of attachment recessed section 29. Accordingly, emblem main body section 34 is disposed to coincide with or substantially coincide with the curvature (average curvature) of front plate section 23 in a state where emblem main body section 34 is positioned in attachment recessed section 29.

Figure 2C:
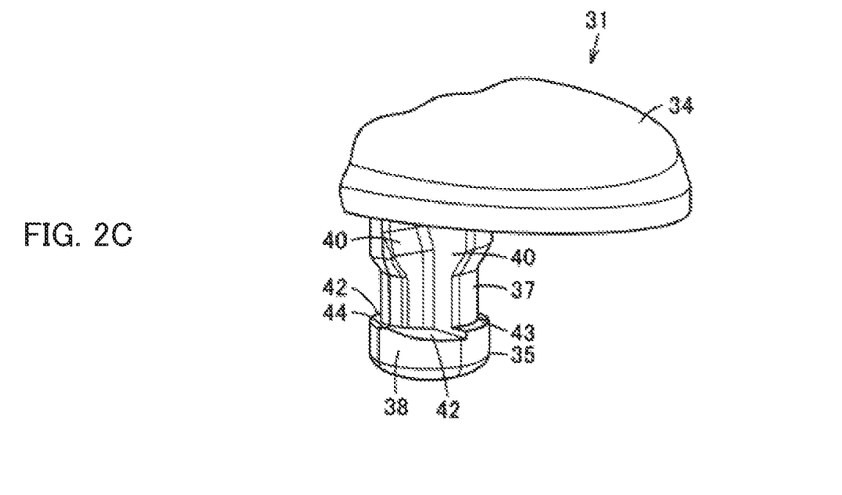
FIG. 2C is a perspective view illustrating an engagement section of the design section.

Pins 35 are respectively inserted through opening sections 28 and engaged with back plate 32. As a result, emblem body 31 is engaged with and fixed to back plate 32 on the cover body 18 side. Pin 35 has shaft section 37 continuous with emblem main body section 34 and enlargement section 38 enlarged in a step shape on the distal end side of shaft section 37. Here, the disposition of pins 35 can be appropriately set in accordance with the shape of emblem body 31 and the like insofar as emblem body 31 can be supported in a balanced manner in the up-down and left-right directions. For example, in the present embodiment, pins 35 are respectively disposed in the middle or substantially middle sections of the three parts of emblem main body section 34. Accordingly, in the present embodiment, pin 35 is disposed on each vertex of an equilateral triangle and in rotational symmetry when viewed from the front.

Shaft section 37 is provided with ribs 40. Although shaft section 37 is provided with plurality of ribs 40 in the present embodiment, rib 40 may be formed to protrude with respect to a columnar base section. For example, three ribs 40 are formed and radially disposed. In other words, ribs 40 extend along a radial direction from the central axis positions of pins 35. Ribs 40 of the present embodiment are equally arranged in a Y shape when viewed from the distal end sides of pins 35.

Enlargement section 38 is enlarged in a direction intersecting with the protrusion direction of pin 35 with respect to shaft section 37. Enlargement section 38 is formed in, for example, a columnar shape. Enlargement section 38 is formed continuously with rib 40 of shaft section 37. In enlargement section 38, inclination section 42, planar section 43 as an abutment surface that is a first contact section, and linear section 44 that is a second contact section are formed at positions on the shaft section 37 side.

Inclination section 42 is inclined at first predetermined angle θ1, which is larger than 0°, toward the distal end side in the protrusion direction with respect to a normal direction (indicated by Arrow Y) that is a predetermined direction intersecting with the protrusion direction of pin 35 from emblem main body section 34 (indicated by Arrow X). In the present embodiment, first predetermined angle θ1 is set to, for example, 9°. In the present embodiment, two inclination sections 42 are formed for each pin 35 and positioned adjacent to each other. In other words, inclination sections 42 and 42 are respectively inclined at first predetermined angle θ1 toward the distal end side in the protrusion direction with respect to normal directions (indicated by Arrows Y1 and Y2) that are predetermined directions opposite to each other and intersecting with the protrusion direction of pin 35. Accordingly, inclination sections 42 and 42 are disposed on both sides with respect to the protrusion direction of pin 35.

Planar section 43 is formed in a planar shape along a direction intersecting with the protrusion direction of pin 35 in enlargement section 38. Planar section 43 is positioned on the shaft section 37 side of pin 35, that is, on the proximal end section side with respect to inclination section 42. Planar section 43 is inclined at second predetermined angle θ2, which is 0° or more, toward the distal end side in the protrusion direction of pin 35 with respect to the normal direction of pin 35. Second predetermined angle θ2 is set smaller than first predetermined angle θ1. For example, second predetermined angle θ2 may be set to 0°. Planar section 43 protrudes in a step shape in the direction opposite to the protrusion direction of pin 35 with respect to inclination section 42. The length of planar section 43 in the normal direction of pin 35 is set shorter than the length of each inclination section 42 in the normal direction of pin 35. Planar section 43 is formed continuously with the outside surface of shaft section 37. In the present embodiment, planar section 43 is connected to one rib 40 and formed to have the same width as rib 40. Planar section 43 has a constant or substantially constant length in the normal direction of pin 35 over the entire width. Planar section 43 is disposed on the same side of plurality of pins 35. For example, planar section 43 of the present embodiment is disposed on the lower right side of each pin 35 when emblem body 31 is viewed from the front. In other words, planar section 43 of the present embodiment is set on the side (lower side) of the direction of the centrifugal force resulting from door section opening with respect to pin 35.

Linear section 44 is formed along the adjacent positions of inclination sections 42 and 42 adjacent to each other. In other words, linear section 44 is formed to extend in a straight line at a position different from planar section 43 along a direction intersecting with the protrusion direction of pin 35. Linear section 44 is disposed in the top sections of inclination sections 42 and 42. In other words, linear section 44 is positioned to protrude in the direction opposite to the protrusion direction of pin 35 with respect to inclination sections 42 and 42.

Figure 4A:
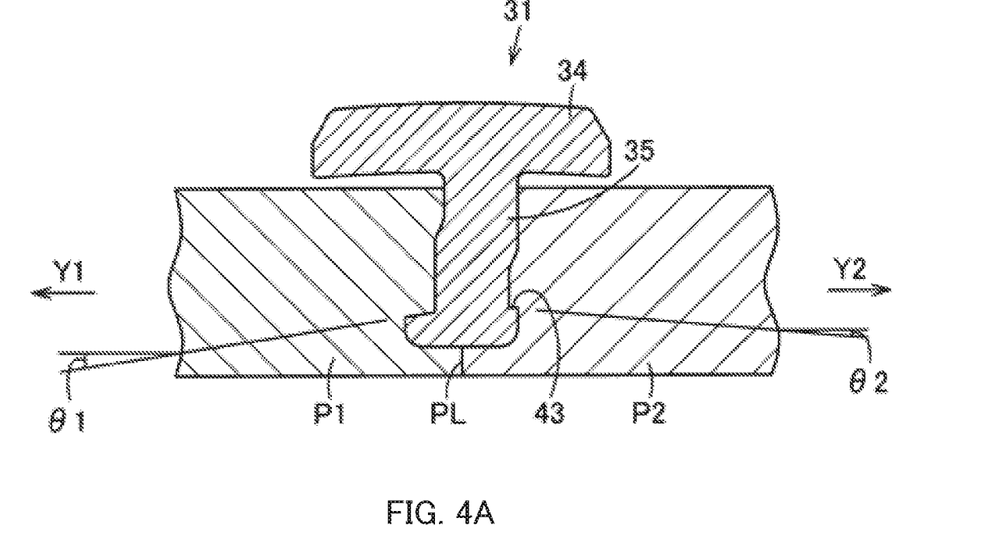
FIG. 4A is a cross-sectional view schematically illustrating a molded state of the decoration member and FIG. 4B is a cross-sectional view in a direction intersecting with the protrusion direction of the engagement section in FIG. 4A.
Figure 4B:
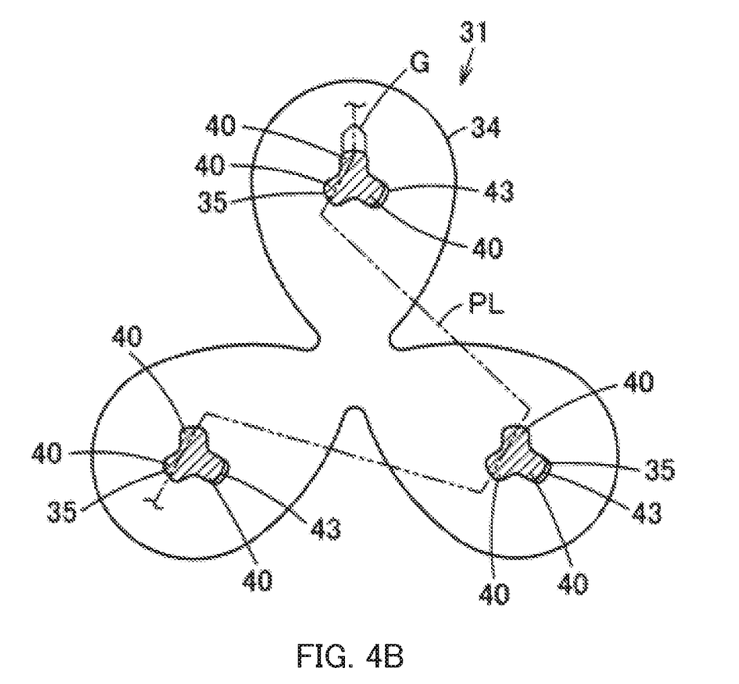

Pin 35 is molded integrally with emblem main body section 34 by molding dies P1 and P2 illustrated in FIG. 4A. Molding dies P1 and P2 are closed to sandwich pin 35 from a direction intersecting with the protrusion direction. As illustrated in FIG. 4B, in the present embodiment, parting line PL of molding dies P1 and P2 is set to cross each pin 35 in a predetermined identical direction intersecting with the protrusion direction. In other words, parting line PL is set in a projecting shape to interconnect a line crossing each of two pins 35 and 35 in a predetermined identical direction and a line crossing remaining one pin 35 in the direction parallel to that direction. In the present embodiment, the direction in which parting line PL crosses each pin 35 is parallel or substantially parallel to the direction in which the positions of the central axes of two pins 35 and 35 are interconnected. Linear section 44 of each pin 35 is formed on parting line PL. In molding dies P1 and P2, gate G is set at the position of one pin 35. In the present embodiment, gate G is set at the position of pin 35 positioned on the upper side of emblem body 31. As illustrated in FIG. 4A, molding dies P1 and P2 are moved in the directions of Arrows Y1 and Y2 and opened. In other words, first predetermined angle θ1 of inclination section 42 is an angle set by the drafts of molding dies P1 and P2.

Emblem main body section 34 is molded in a cavity formed between separate molding dies in communication with the cavity between molding dies P1 and P2. For clarity of description, the molding die for molding emblem main body section 34 will be neither described nor illustrated.

Back plate 32 illustrated in FIGS. 1A, 1B, 3, and 5 is also called a lower emblem or the like. Back plate 32 is molded with, for example, a hard synthetic resin. Back plate 32 is capable of having various shapes insofar as emblem body 31 can be fixed to surface plate section 21 (front plate section 23). For example, back plate 32 is formed in the shape of an equilaterally triangular plate in which each corner section is curved in a circular arc shape. In other words, back plate 32 is formed in rotational symmetry. Back plate 32 is attached to the rear side, which is the airbag side of front plate section 23. In the present embodiment, back plate 32 is disposed on the rear side of attachment recessed section 29. Back plate 32 is positioned with the outer shape position of back plate 32 regulated by rib-shaped regulation section 46 positioned on the rear side of attachment recessed section 29. Back plate 32 has hole sections 48 into which pins 35 of emblem body 31 are respectively inserted. Hole section 48 is formed in, for example, a circular shape. Hole section 48 is disposed to correspond to the disposition of pin 35. In other words, in the present embodiment, pin 35 is disposed on, for example, each vertex of an equilateral triangle. Each hole section 48 has elastic piece section 49, which is an abutting section for locking inserted pin 35. Elastic piece section 49 is a claw section protruding from the inner edge of hole section 48 toward the central section of hole section 48. Elastic piece section 49 has a thickness direction in the insertion/removal direction of pin 35 with respect to hole section 48, which is the protrusion direction of pin 35, and has a plate shape elastically deformable in the thickness direction. In the present embodiment, three elastic piece sections 49 are formed for each hole section 48 and equally spaced apart in the circumferential direction of hole section 48. Accordingly, notch section 50 as a radial groove section along the radial direction of hole section 48 is between elastic piece sections 49 and 49 that are adjacent to each other. Accordingly, in the present embodiment, three notch sections 50 are formed for each hole section 48.

Figure 3:
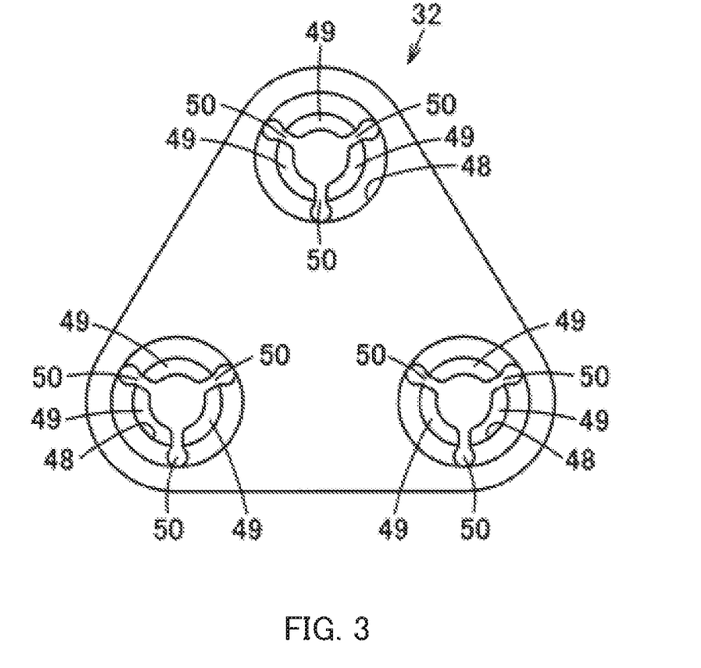
FIG. 3 is a front view illustrating the receiving section.

Elastic piece section 49 facilitates the insertion of pin 35 into hole section 48. Elastic piece section 49 is formed in, for example, a belt shape constantly protruding along the circumferential direction from the inner edge of hole section 48. Elastic piece section 49 is a part against which planar section 43 and linear section 44 of emblem body 31 abut from the direction opposite to the protrusion direction of pin 35 at least during airbag inflation deployment. It is preferable that at least one of planar section 43 and linear section 44 abuts against elastic piece section 49 at all times. For example, although the present embodiment is set such that planar section 43 abuts against elastic piece section 49 at all times and linear section 44 further abuts against elastic piece section 49 during airbag inflation deployment, planar section 43 may further abut against elastic piece section 49 during airbag inflation deployment with linear section 44 abutting against elastic piece section 49 at all times. Alternatively, each of planar section 43 and linear section 44 may abut against elastic piece section 49 at all times.

When cover body 18 is manufactured, cover main body section 19 is injection-molded with a synthetic resin in advance and emblem body 31 and back plate 32 of emblem 20 are separately injection-molded with a synthetic resin. Emblem body 31 is demolded after molding dies P1 and P2 are closed, a resin raw material is injected into the cavity from gate G, the resin raw material is solidified, and molding dies P1 and P2 are subsequently opened. In molded emblem body 31, inclination section 42, planar section 43, and linear section 44 are formed on each pin 35.

Next, molded emblem body 31 is disposed on the front side of front plate section 23 of surface plate section 21 of cover main body section 19, pin 35 is inserted through opening section 28, separately molded back plate 32 is disposed on the rear side of front plate section 23 of surface plate section 21, and pin 35 of emblem body 31 protruding from each opening section 28 is insertion-fitted (press-fitted) with respect to hole section 48 of back plate 32. As a result, respective enlargement sections 38 of pins 35 respectively and elastically deform elastic piece sections 49, elastic piece sections 49 are return-deformed at the positions where enlargement sections 38 pass through elastic piece sections 49 and come into contact with shaft section 37, and emblem body 31 is locked and held by back plate 32. In this state, each rib 40 of shaft section 37 comes into contact with the distal edge of each elastic piece section 49 in each pin 35. In addition, each notch section 50 is positioned between ribs 40 and 40 of shaft section 37 of each pin 35. Accordingly, emblem 20 is firmly fixed in a state where front plate section 23 of surface plate section 21 is sandwiched in the front-rear direction by emblem body 31 and back plate 32. In this state, emblem 20 is disposed without significant protrusion from the surface of front plate section 23 around attachment recessed section 29 with emblem body 31 stored in attachment recessed section 29 and the curved surface on the rear side of emblem main body section 34 of emblem body 31 aligned with the rear of the bottom section of attachment recessed section 29.

When, for example, an automobile collides with airbag apparatus 12 provided with cover body 18 and steering wheel 10 provided with airbag apparatus 12, gas is supplied to the airbag by a control apparatus operating the inflator. Then, the airbag undergoes a rapid inflation deployment, the pressure of the inflation deployment causes surface plate section 21 of cover main body section 19 to break at a position bypassing emblem 20 along the tear line, and the door section is formed. Then, the door section pivots about the hinge section and forms a protrusion port as an opening causing airbag bulging. Then, the airbag is deployed in front of the occupant from the protrusion port and the occupant is protected.

In emblem 20 at this time, planar section 43 of emblem body 31 abuts against elastic piece section 49 of back plate 32 in the planar shape toward the direction opposite to the protrusion direction of pin 35 and linear section 44 of emblem body 31 linearly abuts against elastic piece section 49 of back plate 32 toward the direction opposite to the protrusion direction of pin 35. As a result, back plate 32 is caught with respect to emblem body 31 and pulled integrally with the door section of cover main body section 19, emblem body 31 and back plate 32 remain engaged, and falling from cover main body section 19 is prevented.

As described above, according to one embodiment, planar section 43 is formed in a planar shape along the direction intersecting with the protrusion direction of pin 35 in enlargement section 38 formed to be enlarged on the distal end side of shaft section 37 of pin 35 of emblem body 31, linear section 44 is linearly formed along the direction intersecting with the protrusion direction of pin 35 at a position different from planar section 43, and planar section 43 and linear section 44 abut against elastic piece section 49 of back plate 32 from the direction opposite to the protrusion direction of pin 35 at least during airbag inflation deployment. Accordingly, a contact amount can be ensured between pin 35 of emblem body 31 and elastic piece section 49 of back plate 32 and the engagement force of emblem 20 with respect to cover main body section 19 can be increased by means of a simple configuration. Accordingly, emblem 20 is capable of having a high engagement force, being inexpensive, and enhancing warranty by means of a simple configuration requiring neither detailed perfection nor an increase in the number of parts.

At least one of planar section 43 and linear section 44 of emblem body 31 abuts against elastic piece section 49 of back plate 32 at all times, and thus it is possible to suppress rattling of back plate 32 with respect to emblem body 31.

Second predetermined angle $\theta 2$ as the inclination angle of planar section 43 is set smaller than first predetermined angle $\theta 1$ as the inclination angle of inclination section 42 with respect to the normal direction, which is a predetermined direction intersecting with the direction in which pin 35 protrudes from emblem main body section 34. Accordingly, the contact amount of planar section 43 with respect to elastic piece section 49 of back plate 32 can be ensured and the engagement force of emblem 20 with cover main body section 19 can be further increased.

Linear section 44 is formed along the position where inclination sections 42 and 42 respectively inclined at first predetermined angle $\theta 1$ toward the distal end side in the protrusion direction are adjacent to each other with respect to the normal directions that are predetermined directions opposite to each other and intersecting with the direction in which pin 35 protrudes from emblem main body section 34, and thus linear section 44 can be easily formed by means of parting line PL of molding dies P1 and P2 opened in the opposite normal directions of pins 35.

The length of planar section 43 in the normal direction of pin 35 as a predetermined direction is shorter than the length of inclination section 42. Accordingly, even when second inclination angle $\theta 2$ of planar section 43 is small, pin 35 can be removed from molding dies P1 and P2 opened in the normal direction of pin 35.

By evenly disposing planar section 43 and linear section 44 with respect to the modeling of rotationally symmetric emblem body 31, curved surface alignment between cover main body section 19 and emblem 20 is hardly affected and entire emblem body 31 can be evenly fixed.

In a case where emblem main body section 34 is curved to bulge to the front side along the curvature of front plate section 23 of cover main body section 19 so that the appearance of cover body 18 is improved in particular, first predetermined angle θ1 of inclination section 42 of pin 35, which becomes a draft, has to be increased with respect to the normal direction of pin 35 as the mold opening direction of molding dies P1 and P2 so that emblem body 31 (pin 35) can be removed from molding dies P1 and P2. Then, no wide contact area can be ensured between inclination section 42 and elastic piece section 49 of back plate 32. In this regard, planar section 43 and linear section 44 are allowed to come into contact with elastic piece section 49 in the present embodiment. As a result, it is possible to ensure a contact amount between the pin 35 side and the back plate 32 side and increase the engagement force of emblem 20 with respect to cover main body section 19.

Planar section 43 abuts in a planar shape against one elastic piece section 49 and linear section 44 linearly abuts against another elastic piece section 49. As a result, perfection is facilitated as compared with a configuration in which enlargement section 38 is brought into planar contact with every elastic piece section 49.

Assembly of emblem body 31 to back plate 32 can be easily carried out simply by emblem body 31 being pushed into back plate 32 as in the related art. Accordingly, emblem 20 can be assembled without a change in the assembly facility of the related art.

In the embodiment described above, the direction of planar section 43 may be freely set in accordance with the mold opening directions of molding dies P1 and P2.

The mold opening directions (mold closing directions) of molding dies P1 and P2 are not limited to the normal direction of pin 35 and may be directions inclined with respect to the normal direction. In other words, the mold opening directions (mold closing directions) of molding dies P1 and P2 can be set as predetermined directions intersecting with the protrusion direction of pin 35.

Each of planar section 43 and linear section 44 may abut against elastic piece section 49 only during inflation deployment.

Rib 40 is not an essential configuration, shaft section 37 may be formed in a columnar shape or the like, planar section 43 or linear section 44 may be formed continuously with shaft section 37. Emblem 20 can be implemented regardless of the number of pins 35 insofar as the molding die structure is established.

INDUSTRIAL APPLICABILITY

The present invention can be applied to, for example, cover bodies for airbag apparatuses provided for handles and other parts of various moving bodies as well as the cover body for the airbag apparatus used for the automobile handle (steering wheel).

REFERENCE SIGNS LIST

12 Airbag apparatus
18 Cover body
19 Cover main body section
20 Emblem as decoration member
28 Opening section
31 Emblem body as design section
32 Back plate as receiving section
34 Emblem main body section as design section main body section
35 Pin as engagement section
37 Shaft section
38 Enlargement section
42 Inclination section
43 Planar section as first contact section
44 Linear section as second contact section
49 Elastic piece section as abutting section

What is claimed is:

1. A cover body for an airbag apparatus, provided with an airbag which is inflated and deployed as a result of introduction of gas from a folded state, the cover body comprising:
a cover main body section which covers the airbag in the folded state and tears open as a result of inflation and deployment of the airbag; and
a decoration member which includes a design section and a receiving section and is attached by sandwiching the cover main body section with the design section and the receiving section, wherein
the cover main body section includes an opening section,
the design section has a design section-main body section and at least one engagement section projecting from the design section-main body section and inserted through the opening section,
each of the at least one engagement section has a shaft section connected to the design section-main body section, an enlargement section formed to be enlarged on a distal end side of the shaft section, a first contact section formed in a planar shape along a direction intersecting with a protrusion direction of the engagement section in the enlargement section, and a second contact section linearly formed at a position different from the first contact section along the direction intersecting with the protrusion direction of the engagement section in the enlargement section, and
the receiving section has an abutting section against which the first contact section and the second contact section abut from a direction opposite to the protrusion direction of the engagement section at least during the inflation and deployment of the airbag.

2. The cover body for an airbag apparatus according to claim 1, wherein
each of the at least one engagement section has an inclination section inclined at a first predetermined angle toward a distal end side in the protrusion direction with respect to a predetermined direction intersecting with the direction in which the engagement section protrudes from the design section-main body section, and
the first contact section is inclined at a second predetermined angle smaller than the first predetermined angle toward the distal end side in the protrusion direction with respect to the predetermined direction.

3. The cover body for an airbag apparatus according to claim 2, wherein
each of the at least one engagement section has a plurality of the inclination sections formed adjacent to each other on both sides of the engagement section to be respectively inclined at a first predetermined angle toward a distal end side in the protrusion direction with respect to predetermined directions opposite to each other and intersecting with the direction in which the engagement section protrudes from the design section-main body section, and the second contact section is formed along a position where the plurality of inclination sections are adjacent to each other.

4. The cover body for an airbag apparatus according to claim 3, wherein a length of the first contact section in a predetermined direction is set shorter than a length of each of the plurality of inclination sections in the predetermined direction.

* * * * *